United States Patent
Zhang

(10) Patent No.: US 12,411,646 B2
(45) Date of Patent: Sep. 9, 2025

(54) METHOD AND APPARATUS FOR DISPLAYING MESSAGE BOX, TERMINAL DEVICE AND NON-TRANSITORY COMPUTER-READABLE STORAGE MEDIUM

(71) Applicant: ZTE CORPORATION, Shenzhen (CN)

(72) Inventor: Lian Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/498,431

(22) Filed: Oct. 31, 2023

(65) Prior Publication Data
US 2024/0078072 A1    Mar. 7, 2024

Related U.S. Application Data

(63) Continuation of application No. 17/278,981, filed as application No. PCT/CN2019/109325 on Sep. 30, 2019, now abandoned.

(30) Foreign Application Priority Data

Sep. 30, 2018    (CN) .......................... 201811160640.3

(51) Int. Cl.
G06F 3/14    (2006.01)
G06F 9/451    (2018.01)

(52) U.S. Cl.
CPC ............ *G06F 3/1454* (2013.01); *G06F 9/451* (2018.02)

(58) Field of Classification Search
CPC .... G06F 3/04842; G06F 9/451; G06F 3/0482; G06F 9/542; G06F 21/6218;
(Continued)

(56) References Cited

U.S. PATENT DOCUMENTS 10,298,567 B1 *   5/2019   Chew ...................... H04W 4/18
2010/0192206 A1    7/2010   Aoyama
(Continued)

FOREIGN PATENT DOCUMENTS

CN    103927092 A    7/2014
CN    104572110 A    4/2015
(Continued)

OTHER PUBLICATIONS

Ahire, V. "Difference between Android Activity Context and Application Context," Tutorials Point, May 9, 2023, https://www.tutorialspoint.com/difference-between-android-activity-context-and-application-context.
(Continued)

*Primary Examiner* — Sujit Shah
(74) *Attorney, Agent, or Firm* — Vivacqua Crane, PLLC

(57) ABSTRACT

A method for displaying a message box, a terminal device and a non-transitory computer-readable storage medium are disclosed. The method may be performed by an Android system operated terminal device, the Android system may include an application layer, an application framework layer, and NMS; and the method may include, acquiring, a context object corresponding to an application, and creating a message box object, in response to a start of the application when the terminal device is connected with a screen external to the terminal device; adding the message box object into the NMS, through a preset enqueue interface, reading the screen identity in the message box object through a set screen interface; and displaying the message box object on the external screen corresponding to the screen identity through the NMS.

18 Claims, 5 Drawing Sheets

(58) Field of Classification Search
CPC ......... G09G 2370/022; G09G 2370/04; G09G 2370/10; G09G 2354/00; G09G 2370/16; G09G 5/12; H04L 2209/60; H04M 1/72469

See application file for complete search history.

(56) References Cited

U.S. PATENT DOCUMENTS

| | | | |
|---|---|---|---|
| 2014/0351816 | A1 | 11/2014 | Park |
| 2014/0359443 | A1* | 12/2014 | Hwang ............... H04M 1/724 715/768 |
| 2015/0339005 | A1 | 11/2015 | Li |
| 2017/0187658 | A1* | 6/2017 | Ryu ..................... G06F 16/583 |
| 2017/0255869 | A1 | 9/2017 | Liu et al. |
| 2017/0265046 | A1* | 9/2017 | Chen ..................... H04W 4/80 |
| 2017/0285813 | A1* | 10/2017 | Threlkeld ............ G06F 1/1654 |

FOREIGN PATENT DOCUMENTS

| | | | |
|---|---|---|---|
| CN | 102984343 | B | 9/2015 |
| CN | 105323714 | A | 2/2016 |
| CN | 106371824 | A | 2/2017 |
| CN | 106445533 | A | 2/2017 |
| CN | 106941568 | A | 7/2017 |
| CN | 110968383 | B | 10/2021 |

OTHER PUBLICATIONS

Android Developers. "Dialogs—UI Guide," https://developer.android.com/develop/ui/views/components/dialogs.

ETA Prime "This Can Replace Your Desktop PC! This New 4K Android PC Mode Is Fast," YouTube, uploaded May 22, 2022, https://www.youtube.com/watch?v=- HsJUgXrkNI.

European Patent Office. Extended European Search Report for EP Application No. 19866496.3, mailed Sep. 17, 2021, pp. 1-6.

Game Development. Libgdx—notification popup (something like Toast)—on both Desktop and Android, retrieved from Internet Sep. 8, 2021, pp. 1-3.

Geeks for Geeks. "Notification Manager in Android," retrieved Oct. 10, 2023, https://www.geeksforgeeks.org/notification-manager-in-android/.

International Searching Authority. International Search Report and Written Opinion for PCT Application No. PCT/CN2019/109325 and English translation, mailed Dec. 27, 2019, pp. 1-8.

Markovic, B. "What is Context in Android and which one should you use?", Medium, Jan. 19, 2020, https://medium.com/@banmarkovic/what-is-context-in-android-and-which-one-should-you-use-e1a8c6529652.

Munot, S. "Toast Notification or Dialog Box? Two types of notifications in Android," UXPlanet, Jul. 25, 2017, https://uxplanet.org/toast-notification-or-dialog-box-ae32ad53106d.

Shekhar, A. "Context in Android Application," May 18, 2017, https://amitshekhar.me/blog/context-in-android-application.

Stack Overflow. "How do I display a dialog in android without an Activity context?," Apr. 30, 2012, https://stackoverflow.com/questions/9751088/how-do-i-display-a-dialog-in-android-without-an-activity-context.

The State Intellectual Property Office of People's Republic of China. First Search Report for CN Application No. 2018111606403 and English translation, mailed Aug. 4, 2021, pp. 1-5.

Trusted Reviews. "How to turn an Android smartphone into a PC," Jul. 29, 2016, https://www.trustedreviews.com/how-to/how-to-turn-your-android-smartphone-into-a-pc-2944490.

United States Patent and Trademark Office. Advisory Action for U.S. Appl. No. 17/278,981, mailed Aug. 16, 2023.

United States Patent and Trademark Office. Advisory Action for U.S. Appl. No. 17/278,981, mailed Sep. 21, 2022.

United States Patent and Trademark Office. Final Office Action for U.S. Appl. No. 17/278,981, mailed Jul. 7, 2022.

United States Patent and Trademark Office. Final Office Action for U.S. Appl. No. 17/278,981, mailed May 1, 2023.

United States Patent and Trademark Office. Office Action for U.S. Appl. No. 17/278,981, mailed Dec. 16, 2022.

United States Patent and Trademark Office. Office Action for U.S. Appl. No. 17/278,981, mailed Feb. 8, 2022.

* cited by examiner

METHOD AND APPARATUS FOR DISPLAYING MESSAGE BOX, TERMINAL DEVICE AND NON-TRANSITORY COMPUTER-READABLE STORAGE MEDIUM

CROSS-REFERENCE TO RELATED APPLICATIONS

This Continuation application claims the benefit under 35 U.S.C.120 of application Ser. No. 17/278,981 filed on Mar. 23, 2021, which in turn is a U.S. national phase application that claims the benefit under 35 U.S.C.371 of International Application Serial No. PCT/CN2019/109325 filed Sep. 30, 2019 which in turn claims the benefit of Chinese patent application CN 201811160640.3 filed Sep. 30, 2018, and all of whose entire disclosures are incorporated herein by reference.

TECHNICAL FIELD

The present disclosure relates to the field of terminal device technology, in particular to a method for displaying a message box, a terminal device and a non-transitory computer-readable storage medium.

BACKGROUND

With the rapid development of communication technology and Internet technology, mobile terminals such as mobile phones have been popularized to every household. With the popularity of mobile phones, mobile phones have begun to develop towards personal computer (PC), and a computer mode has emerged. The so-called computer mode means that a mobile phone is connected to a large screen by means of universal serial bus (USB) or wireless-fidelity (Wi-Fi), and outputs an interface and operation mode similar to that of a computer.

In computer mode, an Android system can't display the message box of the Android system on the large screen, so that prompt information from many applications can only be displayed on the mobile phone screen, thus there is lack of flexibility.

SUMMARY

To solve the above technical problems, embodiments of the present disclosure provide a method for displaying message box, a terminal device and a non-transitory computer-readable storage medium, which can solve the problem that the message box can only be displayed on a screen of a mobile phone, and improve the flexibility of message box display.

The technical schemes of the present disclosure are implemented as follows.

In accordance with an aspect of the present disclosure, an embodiment provides a method for displaying a message box, which is performed by an Android system operated terminal device, the Android system may include an application layer, an application framework layer, and a notification management service (NMS); and the method may include: acquiring, by the application layer, a context object corresponding to an application, and creating a message box object, in response to a start of the application when the terminal device is connected with a screen external to the terminal device, where the context object carries a screen identity of a screen object; transmitting the context object into the message box object, such that the message box object acquires the screen object in the context object, and acquires the screen identity in the screen object by means of the screen object; adding, by the application framework layer, the message box object into the NMS, through a preset enqueue interface, and reading, by the NMS, the screen identity in the message box object through a set screen interface, where the screen interface and the preset enqueue interface are interfaces allowing the NMS to communicate with the message box object; and the screen interface is an interface between the message box object and the NMS, and is configured to be called by the NMS to acquire the screen identity from the message box object; and displaying, by the application framework layer, the message box object on the external screen corresponding to the screen identity through the NMS.

In accordance with yet another aspect of the present disclosure, an embodiment provides a terminal device which operates an Android system, where the Android system may include an application layer, an application framework layer, and a notification management service (NMS); and the terminal device comprises: a processor, a memory, a communication interface, a first screen, and a bus for connecting the processor, the memory and the communication interface; where the processor is configured to execute a display program of a message box stored in the memory to perform a method for displaying a message box, the method may include: acquiring, by the application layer, a context object corresponding to an application stored on the terminal device, and creating a message box object in the application layer, in response to a start of the application via an operable interface on a second screen connected to the terminal device; where the second screen is an external device to the terminal device, and has a display different than that of the terminal device, the terminal device is transitioned to a computer mode when the operable interface is output to the second screen, in response to the terminal device connecting to the second screen; and the context object runs throughout a life cycle of the application, and saves a current environment and configuration information of the application; and the message box object is configured to display a prompt message in the application onto the second screen; transmitting the context object into the message box object, such that the message box object acquires the screen object in the context object, and acquires the screen identity in the screen object by means of the screen object; adding, by the application framework layer, the message box object into the NMS, through a preset enqueue interface, and reading, by the NMS, the screen identity in the message box object through a set screen interface, where the screen interface and the preset enqueue interface are interfaces allowing the NMS to communicate with the message box object; and the screen interface is an interface between the message box object and the NMS, and is configured to be called by the NMS to acquire the screen identity from the message box object; and displaying, by the display system, the message box object onto the second screen corresponding to the screen identity based on the registered association relationship.

In accordance with yet another aspect of the present disclosure, an embodiment provides a non-transitory computer-readable storage medium storing a display program of a message box applied to a terminal device, where the display program of a message box, when executed by a first processor, causes the first processor to perform a method for displaying a message box, the method may include: acquiring, within an operating system of the terminal device a context object and a screen identity that identifies a screen of a screen object, and creating a message box object in the application layer of an operating system of the terminal device, in response to a start of an application via an operable interface on the screen connected to the terminal device, where the screen is an external device to the terminal device, and has a display different than that of the terminal device, where the context object corresponds to the application and the context object carries a screen identity of the screen object; where the screen is an external device to the terminal device, and has a display different than that of the terminal device, the terminal device is transitioned to a computer mode where the operable interface is output to the screen, in response to the terminal device connecting to the screen; and the context object runs throughout a life cycle of the application, and saves a current environment and configuration information of the application; and the message box object is configured to display a prompt message in the application onto the screen; and the operating system of the terminal device is the Android system; transmitting, by the operating system of the terminal device, the context object into the message box object, such that the message box object acquires the screen object in the context object, and acquires the screen identity in the screen object by means of the screen object; adding, by the operating system of the terminal device, the message box object into a notification management service (NMS) of the operating system of the terminal device, through a preset enqueue interface in the operating system of the terminal device, and reading, by an application framework layer of the operating system of the terminal device, the screen identity in the message box object by the NMS through a set screen interface, where the screen interface and the preset enqueue interface are interfaces allowing the NMS to communicate with the message box object, and the screen interface is an interface added to a communication interface between the message box object and the NMS, and is configured to be called by the NMS to acquire the screen identity from the message box object; binding, by the NMS, the message box object with the screen identity to form an association relationship, and registering, by the NMS, the association relationship in a display system; and displaying, by the display system, the message box object onto the screen corresponding to the screen identity based on the registered association relationship.

DETAILED DESCRIPTION

In terminal applications, message prompt boxes often appear to give simple prompts to users. The message prompt boxes are displayed in a limited time, and will disappear automatically after a certain time. In the embodiments of this disclosure, the display of message box of an Android system is taken as an example for explanation.

Figure 1:
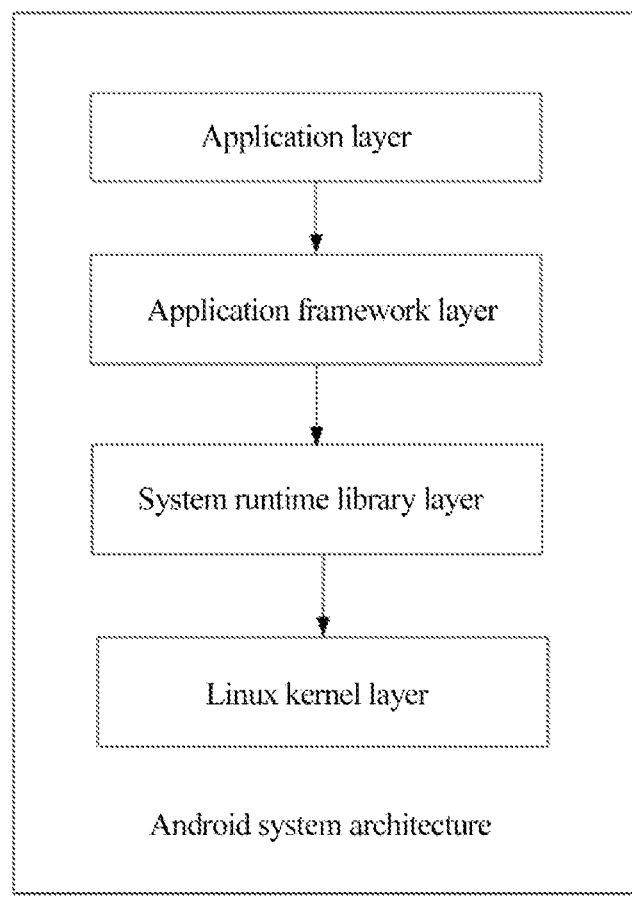
FIG. 1 is an architecture diagram of an Android system according to an embodiment of the present disclosure.

FIG. 1 is an architecture diagram of an Android system according to an embodiment of the present disclosure. As shown in FIG. 1, the Android system architecture may be divided into four layers, including a LINUX kernel layer, a system runtime library layer, an application framework layer, and an application layer. The functions of each layer are as follows.

The LINUX kernel layer provides underlying drivers for various hardware of an ANDROID device, such as display, audio, camera, Bluetooth, WI-FI, power management, etc.

The system runtime library layer includes two parts, one is the system library and the other is the runtime library. Among them, the system library is the support of the application framework and the important link between the application framework layer and the kernel layer of LINUX. Each component in the system library uses the c/c++ library to provide the main feature support, such as the data support provided by the SQLITE, the 3D drawing support provided by the OpenGL|ES library. The runtime library provides some core libraries to allow the developer to write the ANDROID application using Java language.

The application framework layer mainly provides various application programming interfaces (API) that may be used when building applications, and is used by some core applications that come with ANDROID. ANDROID's application framework provides a set of class libraries needed to develop ANDROID applications with a reuse mechanism. The reuse mechanism allows developers to develop applications quickly, and to efficiently use the components of the ANDROID platform or inherit the various application components of the platform for personalized extensions. The application framework layer includes an activity manager, a window manager, a resource manager, a notification manager, a display system, and the like, where the notification manager enables an application program to display custom prompt information in a status bar, which is completed by two classes NotificationManager and Notification.

The application layer includes user-oriented applications, such as applications that come with a mobile phone or applications downloaded by a user.

In the embodiments of the present disclosure, mainly in the application framework layer, personalized expansion is realized on the basis of inheriting various application components of the platform, and a new screen interface is added, so that the display of the message box is more flexible.

In the following section, the technical schemes in the embodiments of the present disclosure will be described in conjunction with the drawings in the embodiments of the present disclosure.

Example Embodiment One

Figure 2:
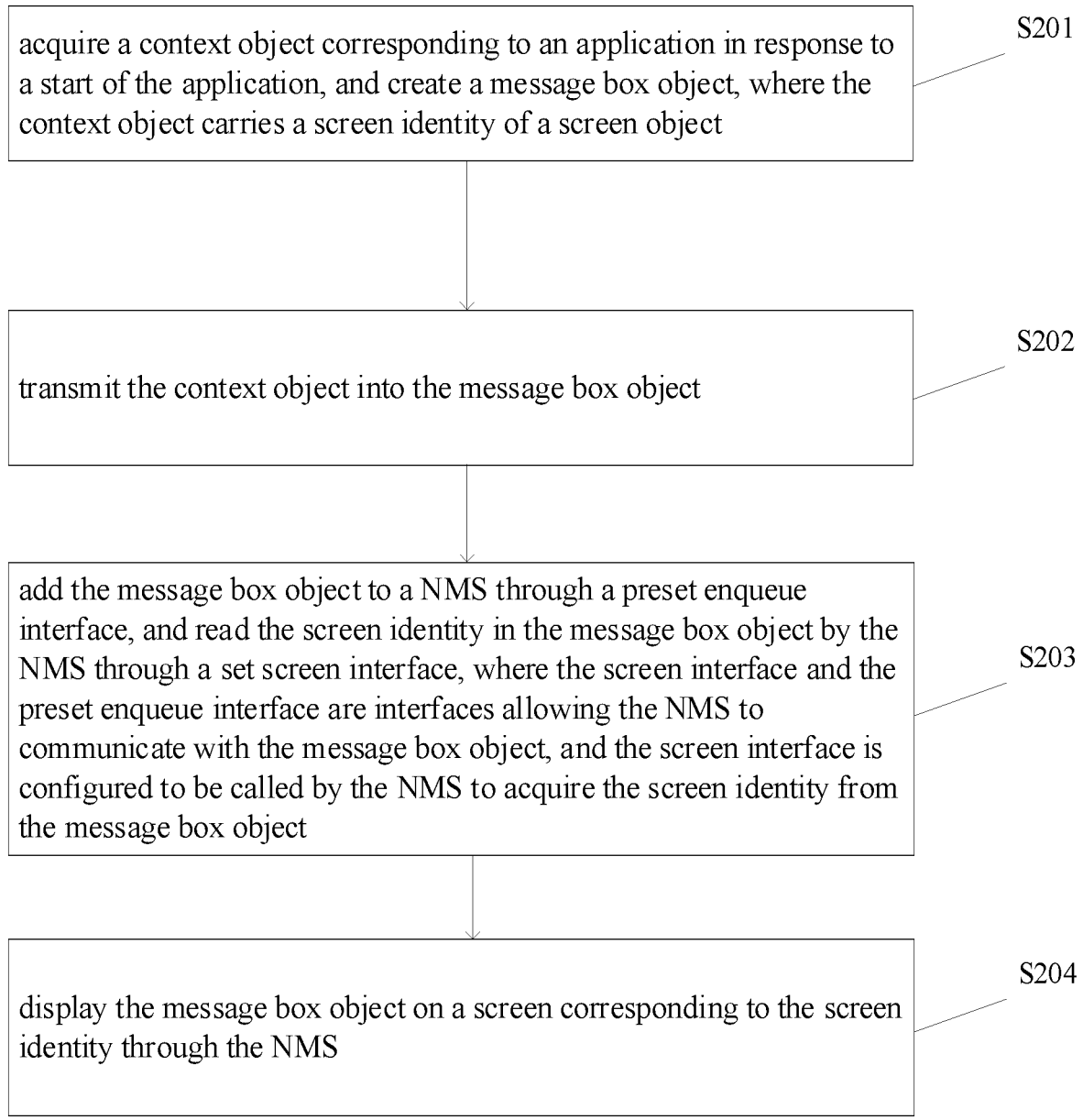
FIG. 2 is a schematic flowchart of a method for displaying a message box according to an embodiment of the present disclosure.

FIG. 2 is a schematic flowchart of a method for displaying a message box according to an embodiment of the present disclosure. As shown in FIG. 2, the method may include steps of S201 to S204.

At S201, a context object corresponding to an application is acquired when an application is started and a message box object is created; where the context object carries a screen identity of a screen object.

In an embodiment of the present disclosure, an application layer of a terminal device acquires a context object when an application is started, and creates a message box object, where the context object carries the screen identity information of the screen object.

In an embodiment, when an application is started by a user in other screens connected to the terminal device, the application layer in the terminal device system automatically triggers the creation of the context object and the message box object. The context object provides global functional and environmental support for the application, which runs throughout the life cycle of the application process, and saves the current environment and configuration information of the application. The message box object is used to display a prompt message in the application.

At S202, the context object is transmitted into the message box object.

In an embodiment of the present disclosure, the application layer of the terminal device transmits the context object into the message box object after acquiring the context object corresponding to the application.

In an embodiment, the message box object acquires the screen object in the context object, and acquires the screen identity in the screen object by means of the screen object. After acquiring the screen identity, the message box object saves the screen identity to a variable name of the message box object, where the variable name is used to represent the screen identity.

In an embodiment of the present disclosure, the process of acquiring the screen identity corresponding to the screen object by means of the screen object is as follows: the message box object acquires a screen identity interface by means of the screen object, and acquires the screen identity based on the screen identity interface.

At S203, the message box object is added to a notification management service (NMS) by means of a preset enqueue interface, and the screen identity in the message box object is read by the NMS by means of a set screen interface, the screen interface and the preset enqueue interface being interfaces allowing the NMS to communicate with the message box object, and the screen interface being configured to be called by the NMS to acquire the screen identity from the message box object.

In an embodiment of the present disclosure, the function of displaying the message box on the terminal device is realized by the terminal device by means of the NMS located in the application framework layer. After the message box object acquires the screen identity in the context object, the application layer of the terminal device will add the message box object to the NMS by means of the preset enqueue interface, and the NMS may acquire the screen identity in the message box object by means of the set screen interface.

In an embodiment, the message box object is added to a sequence to be displayed of the NMS by means of the preset enqueue interface of the NMS, for example, ENQUEUE( ) interface. The sequence to be displayed is used to store all message box objects to be displayed.

In an embodiment of this disclosure, after the message box object is added to the NMS, the process of reading the screen identity in the message box object by the NMS by means of the set interface is: the NMS acquires the screen identity from the variable name of the message box object by means of the set screen interface.

It should be noted that in the embodiments of the present disclosure, the communication between the NMS and the message box object is completed in the application framework layer. By improving an API interface of the application framework layer and setting a new screen interface, the NMS may acquire the screen identity by means of the newly added interface. Before the NMS acquires the screen identity by means of the newly added interface, the application framework layer of the terminal device will add the message box to the NMS by means of the preset enqueue interface.

At S204, the message box object is displayed on a screen corresponding to the screen identity by means of the NMS.

In the embodiments of the present disclosure, after the NMS acquires the screen identity in the message box object, a display system in the application framework layer of the terminal device will display the message box object on the screen corresponding to the screen identity by means of the NMS.

In an embodiment, the NMS binds the message box object with the screen identity to form an association relationship, and registers the association relationship in the display system. The display system displays the message box object on the screen corresponding to the screen identity based on the registered association relationship.

According to an embodiment of the present disclosure, a method for displaying a message box is provided, which is applied to a terminal device. In the above method, by adding a screen interface to the communication interface between the message box object and the NMS, a screen identity may be acquired when an application is started, so that the message box object may be displayed on the screen corresponding to the screen identity, and the flexibility of the display of the message box is improved.

It can be understood that example embodiment one involves the application layer and the application framework layer in the system architecture. In the application layer, the creation of the message box object and the acquisition of the screen identity by the message box object are realized; and in the application framework layer, the communication between the message box object and the NMS is realized. In an embodiment, the message box object communicates with the NMS in the application framework layer by means of the newly added screen interface after acquiring the screen identity in the context object, so that the NMS may acquire the screen identity in the message box object, and the display system may display the message box object on the screen corresponding to the screen identity based on the NMS.

Example Embodiment Two

Figure 3:
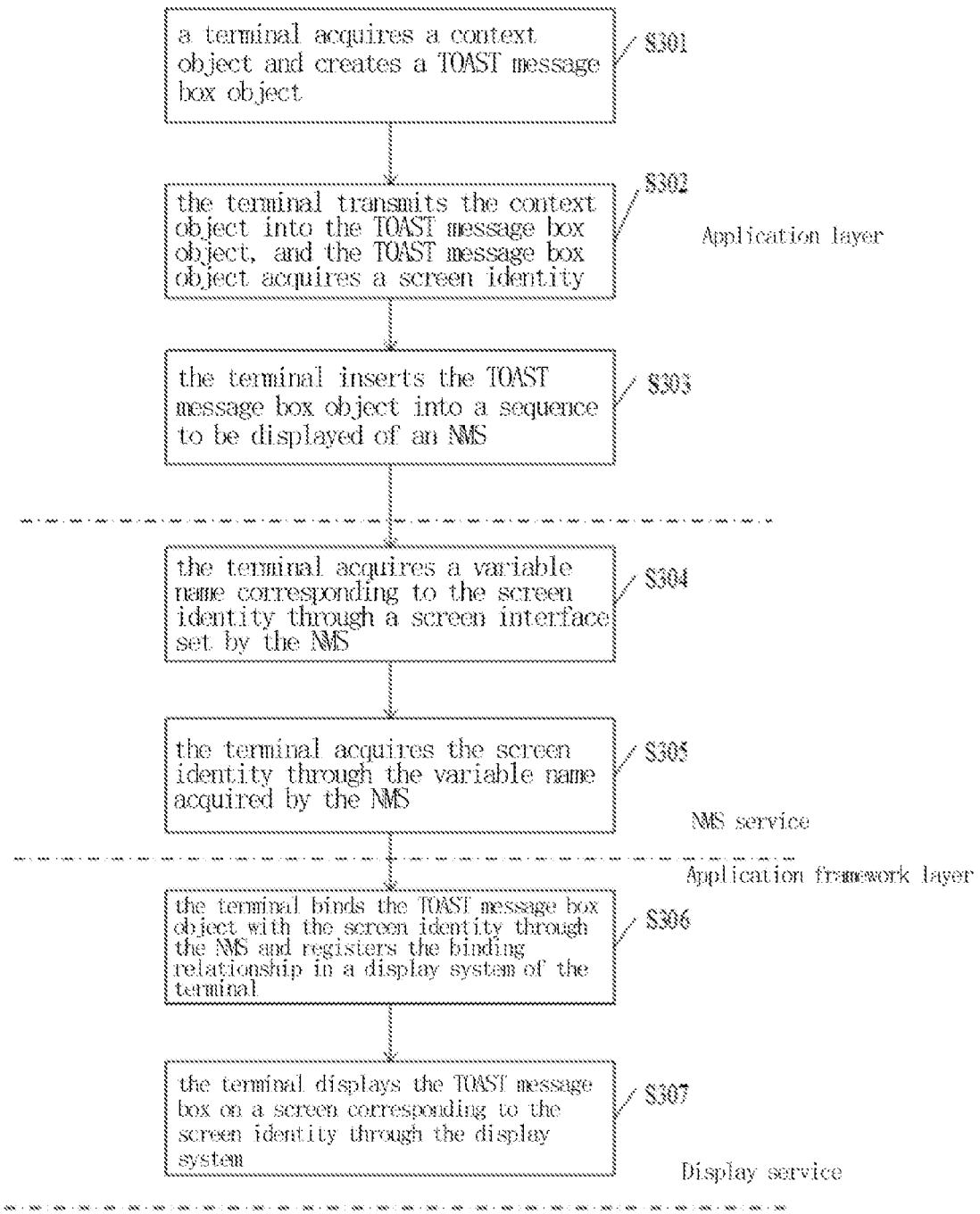
FIG. 3 is a schematic flowchart of a method for displaying an exemplary TOAST message box according to an embodiment of the present disclosure.

Based on the above example embodiment one, the technical scheme of the above embodiment is described in an embodiment by taking the display of TOAST message box of an Android mobile terminal in computer mode as an example. FIG. 3 is a schematic flowchart of a method for displaying an exemplary TOAST message box according to an embodiment of the present disclosure. As shown in FIG. 3, the method includes steps of S301 to s307.

At S301, a terminal device acquires a context object and creates a TOAST message box object.

In the embodiments of the present disclosure, applications are installed on the terminal device. The applications of the terminal device include application programs for realizing various applications, and the application programs are located in an application layer of the Android system architecture. The application layer of the terminal device acquires the context object when an application is started, and creates the TOAST message box object, so that the application program may display a TOAST message based on the TOAST message box object. It should be noted that in the embodiments of the present disclosure, a user connects the terminal device to a large screen by means of the designated large screen, so as to start the computer mode of the terminal device. In the computer mode, when an application having a display of a TOAST message box is started by the user on a large screen connected to the terminal device, the application layer of the terminal device will be triggered to acquire the context object and create the TOAST message box object. In the Android system, the context object is a CONTEXT object, which runs throughout the life cycle of the application process, and saves the current environment and configuration information of the Android system and an application, thereby providing global functional and environmental support for the application. In the embodiments of the present disclosure, the context object includes the identity of the large screen used by the user, which is the screen identity.

At S302, the terminal device transmits the context object into the TOAST message box object, and the TOAST message box object acquires the screen identity.

The application layer of the terminal device will transmit the context object to the TOAST message box object after acquiring the context object, and a first incoming parameter of the TOAST message box object is the context object. The TOAST message box object will acquire the screen identity based on the context object after receiving the context object transmitted from the application layer of the terminal device.

In an embodiment, there is a screen object acquisition interface in the context object. After acquiring the screen object by means of the screen object acquisition interface, the TOAST message box object further acquires the screen identity by means of the screen identity acquisition interface of the screen object, and saves the screen identity in a variable, for example, MDISPLAYID.

At S303, the terminal device inserts the TOAST message box object into a sequence to be displayed of the NMS.

In embodiments of the present disclosure, in the NMS, there is a sequence to be displayed that stores the TOAST message box object to be displayed. After creating the TOAST message box object, the application layer of the terminal device may need to insert the TOAST message box object into the sequence to be displayed of the NMS to complete the enqueue operation.

It should be noted that in the embodiments of the present disclosure, the NMS is located in the application framework layer in the Android system architecture of the terminal device. The application framework layer provides various APIs for application development, and the application layer communicates with the application framework layer based on an API.

In an embodiment of the present disclosure, the application layer of the terminal device inserts the TOAST message box object into the sequence to be displayed of the NMS by means of the preset enqueue interface, which is an ENQUEUE( ) interface.

At S304, the terminal device acquires a variable name corresponding to the screen identity by means of the screen interface set by the NMS.

In an embodiment of the present disclosure, the NMS located in the application framework layer acquires a TOAST message box object with the smallest sequence number in the sequence to be displayed, and acquires the variable name corresponding to the screen identity by means of the set screen interface.

It should be noted that, in an embodiment of the present disclosure, the TOAST message box object communicates with the NMS interface by means of an interface file of the Android system, and the interface file name is ITransientNotification.aidl. In the original interface file, there are two interfaces, one is SHOW( ), and the other is HIDEO. The NMS may call a SHOW( ) method in the interface file to display TOAST, and hide TOAST by means of a HIDE( ) method.

However, in an embodiment of this disclosure, a new screen interface, for example, GETDISPLAYID( ) is added to the interface file of ITransientNotification.aidl, through which the NMS may acquire the variable MDISPLAYID in the TOAST message box object.

At S305, the terminal device acquires the screen identity by means of the variable name acquired by the NMS.

In an embodiment of the present disclosure, after acquiring the variable name, the NMS of the application framework layer of the terminal device may acquire the screen identity in the TOAST message box object by means of the variable name.

At S306, the terminal device binds the TOAST message box object with the screen identity by means of the NMS and registers the binding relationship in a display system of the terminal device.

In an embodiment of the present disclosure, the NMS of the application framework layer of the terminal device will bind the TOAST message box object with the screen identity after acquiring the screen identity, and register the binding relationship in the display system of the terminal device for display by the display system. It should be noted that the display system is also located in the application framework layer of the terminal device.

At S307, the terminal device displays the TOAST message box on a screen corresponding to the screen identity by means of the display system.

In an embodiment of the present disclosure, the display system of the application framework layer will display the TOAST message box on the screen corresponding to the screen identity after acquiring the binding relationship between the TOAST message box object and the screen identity.

It should be noted that, the display system will display the TOAST message box object on the screen of the mobile terminal by default if the binding relationship between the TOAST message box object and the screen identity is not acquired by the display system.

As described above, in some embodiments of the present disclosure, the process of S301 to S303 are executed in the application layer of the Android system architecture, while the process of S304 to S307 are implemented in the application framework layer of the Android system architecture. It can be understood that, according to some embodiments of the present disclosure, a screen interface is added to the communication interface between the TOAST message box and the NMS to acquire the screen identity when an application is started, so that the TOAST message box object may be displayed on the screen corresponding to the screen identity, which improves the flexibility of the display of message box and improves the user experience in computer mode.

Example Embodiment Three

Figure 4:
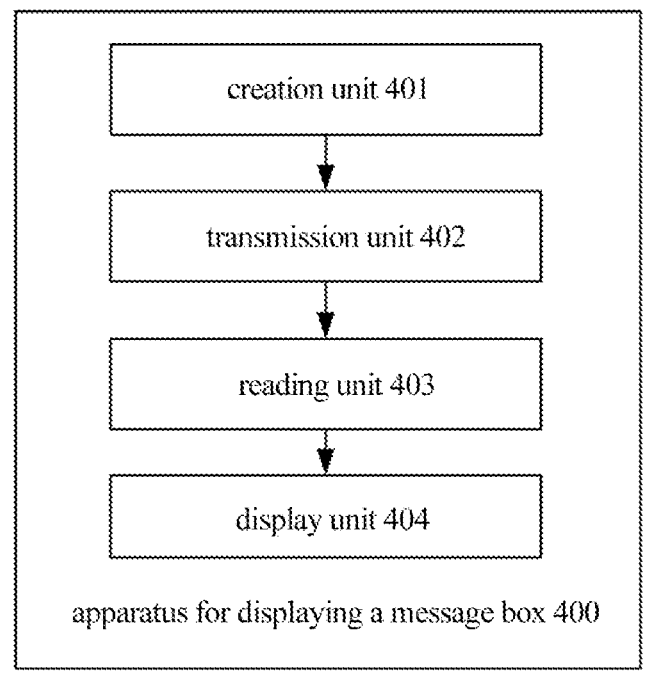
FIG. 4 is a structural diagram of an apparatus for displaying a message box according to an embodiment of the present disclosure.

Based on the same inventive concept of example embodiment one, an apparatus for displaying a message box is provided. FIG. 4 is a structural diagram of an apparatus for displaying a message box according to an embodiment of the present disclosure. As shown in FIG. 4, in an embodiment of the present disclosure, an apparatus for displaying a message box 400 includes a creation unit 401, a transmission unit 402, a reading unit 403 and a display unit 404. The creation unit 401 is configured to acquire a context object corresponding to an application when an application is started and create a message box object, the context object carrying a screen identity of a screen object. The transmission unit 402 is configured to transmit the context object into the message box object. The reading unit 403 is configured to add the message box object to a NMS by means of a preset enqueue interface, and read the screen identity in the message box object by the NMS by means of a set screen interface, where the screen interface and the preset enqueue interface are interfaces allowing the NMS to communicate with the message box object, and the screen interface is configured to be called by the NMS to acquire the screen identity from the message box object. The display unit 404 is configured to display the message box object on a screen corresponding to the screen identity by means of the NMS.

In some embodiments, the transmission unit 402 is also configured to acquire the screen object in the context object, acquire the screen identity corresponding to the screen object by means of the screen object, and save the screen identity to a variable name of the message box object, where the variable name is used for representing the screen identity.

In some embodiments, the transmission unit 402 is also configured to acquire a screen identity interface by means of the screen object, and acquire the screen identity based on the screen identity interface.

Figure 5:
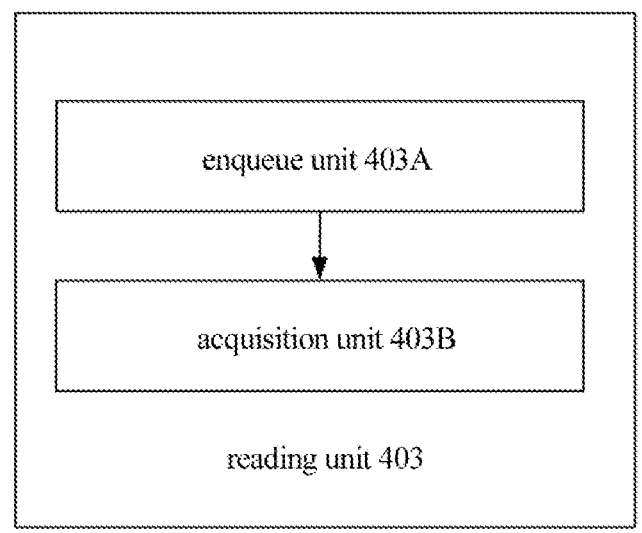
FIG. 5 is a structural diagram of a reading unit in an apparatus for displaying a message box according to an embodiment of the present disclosure.

FIG. 5 is a structural diagram of a reading unit 403 in an apparatus for displaying a message box according to an embodiment of the present disclosure. In some embodiments, as shown in FIG. 5, the reading unit 403 includes an enqueue unit 403A and an acquisition unit 403B. The enqueue unit 403A is configured to add the message box object to a sequence to be displayed of the NMS by means of a preset enqueue interface of the NMS. The acquisition unit 403B is configured for the NMS to acquire the screen identity from a variable name of the message box object by means of the set screen interface.

Figure 6:
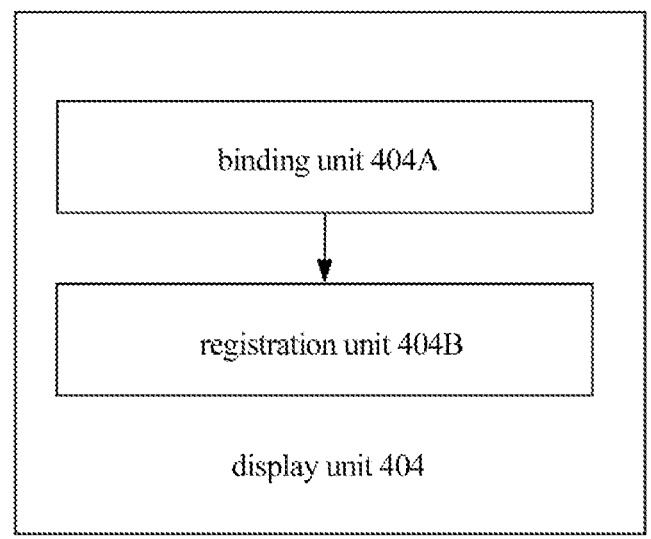
FIG. 6 is a structural diagram of a display unit in an apparatus for displaying a message box according to an embodiment of the present disclosure.

FIG. 6 is a structural diagram of a display unit 404 in an apparatus for displaying a message box according to an embodiment of the present disclosure. In some embodiments, as shown in FIG. 6, the display unit 404 includes a binding unit 404A and a registration unit 404B. The binding unit 404A is configured for the NMS to bind the message box object with the screen identity to form an association relationship. The registration unit 404B is configured for the NMS to register the association relationship between the message box object and the screen identity in a display system, and display the message box object on the screen corresponding to the screen identity based on the association relationship.

The description of the apparatus embodiment of the present disclosure is similar to the description of the method embodiment in the above example embodiment one, and has similar beneficial effects as the method embodiment. For the technical details not disclosed in the apparatus embodiment of the present disclosure, please refer to the description of the method embodiment of the present disclosure.

Example Embodiment Four

Accordingly, based on the same inventive concept of example embodiment one, a terminal device is provided.

Figure 7:
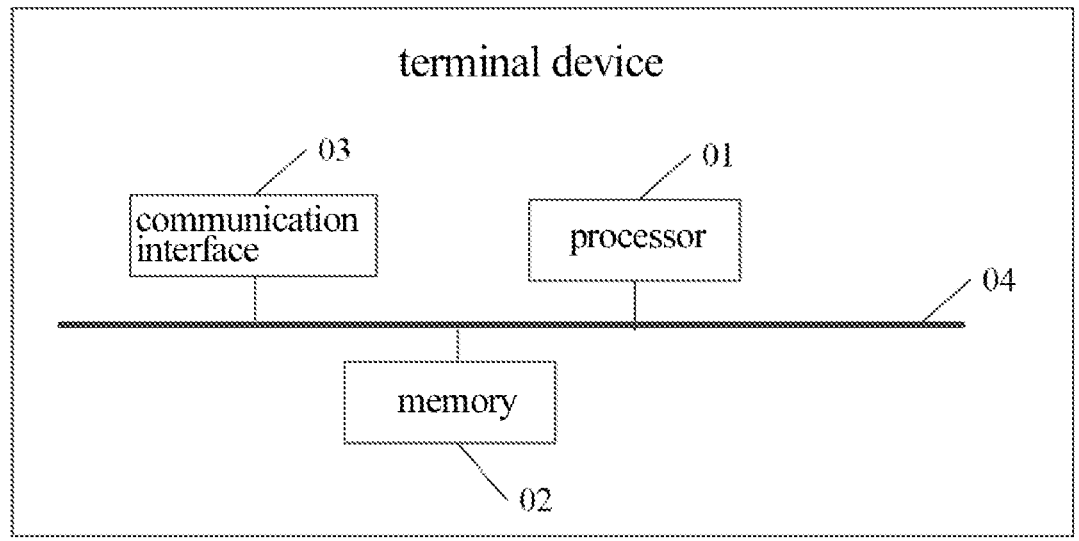
FIG. 7 is a schematic structural diagram of a terminal device according to an embodiment of the present disclosure.

FIG. 7 is a schematic structural diagram of a terminal device according to an embodiment of the present disclosure. As shown in FIG. 7, the terminal device may include a processor 01, a memory 02 storing instructions executable by the processor 01, a communication interface 03, and a bus 04 for connecting the processor 01, the memory 02 and the communication interface 03. The processor 01 is configured to execute a display program of a message box stored in the memory to realize the following steps: acquiring a context object corresponding to an application when an application is started and creating a message box object; where the context object carries a screen identity of a screen object; transmitting the context object into the message box object; adding the message box object to a NMS by means of a preset enqueue interface, and reading the screen identity in the message box object by the NMS by means of a set screen interface, the screen interface and the preset enqueue interface being interfaces allowing the NMS to communicate with the message box object, and the screen interface being configured to be called by the NMS to acquire the screen identity from the message box object; and displaying the message box object on a screen corresponding to the screen identity by means of the NMS.

In an embodiment, transmitting the context object into the message box object includes: acquiring the screen object in the context object; acquiring the screen identity corresponding to the screen object by means of the screen object; and saving the screen identity to a variable name of the message box object, the variable name being used for representing the screen identity.

In an embodiment, acquiring the screen identity corresponding to the screen object by means of the screen object includes: acquiring a screen identity interface by means of the screen object; and acquiring the screen identity based on the screen identity interface.

In an embodiment, adding the message box object to the NMS by means of the preset enqueue interface includes: adding the message box object to a sequence to be displayed of the NMS by means of the preset enqueue interface of the NMS.

In an embodiment, reading the screen identity in the message box object by the NMS by means of the set screen interface includes: acquiring the screen identity from a variable name of the message box object by the NMS by means of the set screen interface.

In one of the above embodiments, displaying the message box object on the screen corresponding to the screen identity by means of the NMS includes: registering an association relationship between the message box object and the screen identity in a display system by the NMS; and displaying the message box object on the screen corresponding to the screen identity based on the association relationship.

In an embodiment, before registering the association relationship between the message box object and the screen identity in the display system by the NMS, the method also includes: binding the message box object with the screen identity by the NMS, to form the association relationship.

In an embodiment of the present disclosure, the processor 01 may be at least one of an application specific integrated circuit (ASIC), a digital signal processor (DSP), a digital signal processing device (DSPD), a programmable logic device (PLD), a field programmable gate array (FPGA), a CPU, a controller, a microcontroller, and a microprocessor. It will be understood that, for different devices, there may be other electronic components for implementing the above-described processing functions, and are not specifically limited in the embodiments of the present disclosure. A device may also include a memory 02, which may be connected to the processor 01, where the memory 02 is configured to store a control program code including computer operation instructions. The memory 02 may include a high-speed RAM memory, or may further include a non-volatile memory, such as at least two disk memories.

In a practical application, the memory 02 may be a volatile first memory, such as a random access first memory (RAM); or a non-volatile first memory, such as a read-only first memory (ROM), a flash first memory, a hard disk drive (HDD) or a solid-state drive (SSD); or a combination of the above-described first memories, and provide instructions and data to the processor 01.

In addition, the functional modules in an embodiment may be integrated into one processing unit, or may exist as physically independent units, or may be integrated into one unit by every two or more of the modules. The independent units or integrated unit(s) above may be implemented in the form of hardware(s) or software functional module(s).

If the integrated unit is implemented in the form of a software functional module and is not sold or used as an independent product, it may be stored in a non-transitory computer-readable storage medium. Based on such understanding, the technical scheme of an embodiment in essence or in the part that contributes to the prior art, or the whole or part of the technical scheme, can be embodied in the form of software product. When the software product is stored in a non-transitory computer-readable storage medium, the storage medium includes several instructions for causing a computer device (which may be a personal computer, a server, a network device, or the like) or a processor to perform all or part of the steps of the method of an embodiment. The foregoing storage medium includes a USB flash drive, a removable hard disk, a read only memory (ROM), a random access memory (RAM), a magnetic disk, an optical disc, or any other medium that can store program code.

An embodiment of the present disclosure provides a terminal device, in which a screen interface is added to a communication interface between a message box object and a notification management service (NMS) to acquire a screen identity, so that the message box object can be displayed on a screen corresponding to the screen identity, and the flexibility of message box display is improved.

An embodiment of the present disclosure provides a non-transitory computer-readable storage medium having stored thereon a message box display program, when executed by a processor, the message box display program causes the processor to implement the methods of example embodiments one and two.

Those having ordinary skills in the art shall understand that embodiments of the present disclosure may be provided as a method, a system, or a computer program product. Accordingly, the present disclosure may take the form of a hardware embodiment, a software embodiment, or an embodiment incorporating software and hardware aspects. Moreover, the present disclosure may take the form of computer program products implemented on one or more non-transitory computer-readable storage medium (including, but not limited to, a magnetic disk memory, an optical memory, and the like) containing computer-readable program code.

The present disclosure is described with reference to a flowchart and/or a block diagram of a method, a device (system), and a computer program product according to the embodiments of the present disclosure. It shall be understood that each step flow and/or block in the flowchart and/or block diagram and a combination of step flows and/or blocks in the flowchart and/or block diagram may be implemented by computer program instructions. These computer program instructions may be provided to a processor of a general-purpose computer, a dedicated-purpose computer, an embedded processing device, or other programmable data processing device to generate a machine such that instructions executed by a processor of a computer or other programmable data processing device generate means for implementing function(s) specified in one or more step flows in a flowchart and/or one or more blocks in a block diagram.

These computer program instructions may also be stored in a computer-readable memory capable of directing a computer or other programmable data processing device to operate in a particular manner such that instructions stored in the computer-readable memory produce an article including an instruction device that implement function(s) specified in one or more step flows in a flowchart and/or one or more blocks in a block diagram.

These computer program instructions may also be loaded onto a computer or other programmable data processing device such that a series of operational steps are performed on the computer or other programmable device to generate computer-implemented processing, and such that the instructions executed on the computer or other programmable device provide step(s) for implementing function(s) specified in one or more step flows in a flowchart and/or one or more blocks in a block diagram.

According to an embodiment of the present disclosure, a method and an apparatus for displaying a message box, a terminal device and a non-transitory computer-readable storage medium are provided. The method includes: acquiring a context object corresponding to an application when an application is started and creating a message box object, the context object carrying a screen identity of a screen object; transmitting the context object into the message box object; adding the message box object to a NMS by means of a preset enqueue interface, and reading the screen identity in the message box object by the NMS by means of a set screen interface, the screen interface and the preset enqueue interface being interfaces allowing the NMS to communicate with the message box object, and the screen interface being called by the NMS to acquire the screen identity from the message box object; and displaying the message box object on a screen corresponding to the screen identity by means of the NMS. That is to say, according to the method for displaying a message box provided by the embodiments of the present disclosure, a screen interface is added to the communication interface between the message box object and the NMS to acquire the screen identity, so that the message box may be displayed on the screen corresponding to the screen identity.

Several embodiments are described above in the present disclosure, which are not intended to limit the scope of protection of the present disclosure.

What is claimed is:

1. A method for displaying a message box, which is performed by an Android system operated terminal device, the Android system comprising an application layer, an application framework layer, and a notification management service (NMS); and the method comprising:
acquiring, by the application layer, a context object corresponding to an application, and creating a TOAST message box object, in response to a start of the application when the terminal device is connected with a screen external to the terminal device, wherein the context object carries a screen identity of a screen object;

transmitting the context object into the TOAST message box object, such that the TOAST message box object acquires the screen object in the context object, and acquires the screen identity in the screen object by means of the screen object;

adding, by the application framework layer, the TOAST message box object into the NMS, through an enqueue( ) interface, and reading, by the NMS, the screen identity in the TOAST message box object through a function GetDisplayId, wherein the function GetDisplayId and enqueue( ) interface are interfaces allowing the NMS to communicate with the TOAST message box object; and the function GetDisplayId is an interface between the TOAST message box object and the NMS, and is configured to be called by the NMS to acquire the screen identity from the TOAST message box object; and displaying, by the application framework layer, the TOAST message box object on the external screen corresponding to the screen identity through the NMS.

2. The method of claim 1, wherein transmitting the context object into the TOAST message box object comprises:

acquiring the screen object in the context object;

acquiring the screen identity corresponding to the screen object through the screen object; and saving the screen identity to a variable mDisplayID in the TOAST message box object, wherein the variable mDisplayID is arranged to represent the screen identity; wherein the TOAST message box object is configured to display a prompt message in the application, and communication between the NMS and the TOAST message box object is completed in the application framework layer of the system; and wherein, the function GetDisplayId is added to an interface file of ITransientNotification.aidl.

3. The method of claim 2, wherein acquiring the screen identity corresponding to the screen object through the screen object comprises:

acquiring a screen identity interface through the screen object; and acquiring the screen identity based on the screen identity interface.

4. The method of claim 1, wherein adding the TOAST message box object to the NMS through the enqueue( ) interface comprises:

adding the TOAST message box object to a sequence to be displayed of the NMS through the enqueue( ) interface of the NMS.

5. The method of claim 1, wherein reading the screen identity in the TOAST message box object by the NMS through the function GetDisplayId comprises:

acquiring the screen identity from a variable mDisplayID in the TOAST message box object by the NMS through the function GetDisplayId.

6. The method of claim 1, wherein displaying the TOAST message box object on the screen corresponding to the screen identity through the NMS comprises:

registering an association relationship between the TOAST message box object and the screen identity in a display system by the NMS, wherein the display system is located in the application framework layer of the terminal device; and displaying the TOAST message box object on the screen corresponding to the screen identity based on the association relationship.

7. The method of claim 6, wherein before registering the association relationship between the TOAST message box object and the screen identity in the display system by the NMS, the method further comprises:

binding the TOAST message box object with the screen identity by the NMS, to form the association relationship.

8. The method of claim 1, wherein the context object is created by the application layer of the operating system of the terminal device in response to the start of the application when the terminal device is connected to another screen.

9. The method of claim 1, wherein the context object runs throughout a life cycle of the application, and saves a current environment and configuration information of the application; and the TOAST message box object is configured to display a prompt message in the application onto the screen.

10. The method of claim 1, wherein the start of the application is caused via an operable interface on the external screen connected to the terminal device.

11. The method of claim 10, wherein the terminal device is transitioned to a computer mode and outputs the operable interface onto the external screen, in response to the terminal device connecting to the external screen.

12. The method of claim 11, wherein the operable interface shown on the external screen is distinct from another operable interface showing on the screen of the terminal device.

13. The method of claim 1, wherein the application is stored on the terminal device.

14. The method of claim 1, wherein the TOAST message box object communicates with the NMS by means of an interface file ITransientNotification.aidl; and the NMS is configured to call a SHOW( ) method in the interface file to display the TOAST message box object, and to hide TOAST message box object by means of a HIDE ( ) method in the interface file.

15. A terminal device which operates an Android system, wherein, the Android system comprises an application layer, an application framework layer, and a notification management service (NMS); and the terminal device comprises: a processor, a memory, a communication interface, a first screen, and a bus for connecting the processor, the memory and the communication interface; wherein the processor is configured to execute a display program of a message box stored in the memory to perform a method for displaying a message box, the method comprising:

acquiring, by the application layer, a context object corresponding to an application stored on the terminal device, and creating a TOAST message box object in the application layer, in response to a start of the application via an operable interface on a second screen connected to the terminal device; wherein the second screen is an external device to the terminal device, and has a display different than that of the terminal device, the terminal device is transitioned to a computer mode when the operable interface is output to the second screen, in response to the terminal device connecting to the second screen; and the context object runs throughout a life cycle of the application, and saves a current environment and configuration information of the application; and the TOAST message box object is configured to display a prompt message in the application onto the second screen;

transmitting the context object into the TOAST message box object, such that the TOAST message box object acquires a screen object in the context object, and acquires a screen identity in the screen object by means of the screen object;

adding, by the application framework layer, the TOAST message box object into the NMS, through a enqueue( ) interface, and reading, by the NMS, the screen identity in the TOAST message box object through a function GetDisplayId, wherein the function GetDisplayId and the enqueue( ) interface are interfaces allowing the NMS to communicate with the TOAST message box object; and the function GetDisplayId is an interface between the TOAST message box object and the NMS, and is configured to be called by the NMS to acquire the screen identity from the TOAST message box object; and displaying, by the display system, the TOAST message box object onto the second screen corresponding to the screen identity based on a registered association relationship.

16. A non-transitory computer-readable storage medium storing a display program of a message box applied to a terminal device, wherein the display program of a message box, when executed by a first processor, causes the first processor to perform a method for displaying a message box, the method comprising:

acquiring, within an operating system of the terminal device a context object and a screen identity that identifies a screen of a screen object, and creating a TOAST message box object in an application layer of an operating system of the terminal device, in response to a start of an application via an operable interface on the screen connected to the terminal device, wherein the screen is an external device to the terminal device, and has a display different than that of the terminal device, wherein the context object corresponds to the application and the context object carries a screen identity of the screen object; wherein the screen is an external device to the terminal device, and has a display different than that of the terminal device, the terminal device is transitioned to a computer mode where the operable interface is output to the screen, in response to the terminal device connecting to the screen; and the context object runs throughout a life cycle of the application, and saves a current environment and configuration information of the application; and the TOAST message box object is configured to display a prompt message in the application onto the screen; and the operating system of the terminal device is Android system;

transmitting, by the operating system of the terminal device, the context object into the TOAST message box object, such that the TOAST message box object acquires the screen object in the context object, and acquires the screen identity in the screen object by means of the screen object;

adding, by the operating system of the terminal device, the TOAST message box object into a notification management service (NMS) of the operating system of the terminal device, through a enqueue( ) interface in the operating system of the terminal device, and reading, by an application framework layer of the operating system of the terminal device, the screen identity in the TOAST message box object by the NMS through a function GetDisplayId, wherein the function GetDisplayId and the enqueue( ) interface are interfaces allowing the NMS to communicate with the TOAST message box object, and the function GetDisplayId is an interface added to a communication interface between the TOAST message box object and the NMS, and is configured to be called by the NMS to acquire the screen identity from the TOAST message box object;

binding, by the NMS, the TOAST message box object with the screen identity to form an association relationship, and registering, by the NMS, the association relationship in a display system; and displaying, by the display system, the TOAST message box object onto the screen corresponding to the screen identity based on the registered association relationship.

17. The terminal device of claim 15, wherein the TOAST message box object communicates with the NMS by means of an interface file ITransientNotification.aidl; and the NMS is configured to call a SHOW( ) method in the interface file to display the TOAST message box object, and to hide TOAST message box object by means of a HIDE ( ) method in the interface file.

18. The non-transitory computer-readable storage medium of claim 16, wherein the TOAST message box object communicates with the NMS by means of an interface file ITransientNotification.aidl; and the NMS is configured to call a SHOW( ) method in the interface file to display the TOAST message box object, and to hide TOAST message box object by means of a HIDE ( ) method in the interface file.

* * * * *